United States Patent
Hurnik et al.

(10) Patent No.: US 12,439,928 B2
(45) Date of Patent: Oct. 14, 2025

(54) ANIMAL EUTHANASIA METHOD AND APPARATUS

(71) Applicant: 11778188 CANADA INC, Prince Edward Island (CA)

(72) Inventors: Daniel Hurnik, Charlottetown (CA); Scott Christopher Dingwell, Mount Stewart (CA); Curtiss Gerard Littlejohn, Burford (CA)

(73) Assignee: 11778188 CANADA INC., Prince Edward Island (CA)

( * ) Notice: Subject to any disclaimer, the term of this patent is extended or adjusted under 35 U.S.C. 154(b) by 52 days.

(21) Appl. No.: 18/480,138

(22) Filed: Oct. 3, 2023

(65) Prior Publication Data

US 2024/0023566 A1 Jan. 25, 2024

Related U.S. Application Data

(62) Division of application No. 17/261,951, filed as application No. PCT/CA2019/051021 on Jul. 24, 2019, now Pat. No. 11,779,025.

(60) Provisional application No. 62/702,510, filed on Jul. 24, 2018.

(51) Int. Cl.
  *A22B 3/00* (2006.01)
  *A01M 19/00* (2006.01)
  *A22B 3/06* (2006.01)

(52) U.S. Cl.
  CPC .............. *A22B 3/06* (2013.01); *A01M 19/00* (2013.01)

(58) Field of Classification Search
  CPC ........... A22B 3/06; A22B 3/083; A22B 3/086; A22B 3/005; A61D 7/04
  USPC ............................................................. 452/58
  See application file for complete search history.

(56) References Cited

U.S. PATENT DOCUMENTS

| | | | |
|---|---|---|---|
| 1,110,186 A | | 9/1914 | Carmichael |
| 4,586,216 A | * | 5/1986 | Grajoszex ................ A22B 3/06 452/53 |
| 5,899,802 A | * | 5/1999 | Burnett ..................... A22B 3/06 452/141 |
| 5,906,540 A | * | 5/1999 | Grandin .................... A22B 3/06 452/58 |
| RE37,266 E | * | 7/2001 | Te Dorsthorst .......... A22B 3/06 452/58 |

(Continued)

FOREIGN PATENT DOCUMENTS

| | | |
|---|---|---|
| JP | S6227112 Y2 | 7/1987 |
| JP | 2004500853 A | 1/2004 |
| WO | 2007121554 A1 | 11/2007 |

OTHER PUBLICATIONS

International Search Report issued Sep. 13, 2019 for PCT/CA2019/051021.

(Continued)

*Primary Examiner* — Richard T Price, Jr.
(74) *Attorney, Agent, or Firm* — Schmeiser, Olsen & Watts, LLP

(57) ABSTRACT

A method and apparatus involving a euthanasia process are provided. The euthanasia process is carried out in a chamber including electric stunning to induce insensibility and reduced atmospheric pressure to induce hypoxia. The described method and apparatus provide a more humane system for euthanizing animals and reducing any negative impacts for people carrying out the process.

8 Claims, 8 Drawing Sheets

(56) References Cited

U.S. PATENT DOCUMENTS

| | | | |
|---|---|---|---|
| 6,471,576 B1 * | 10/2002 | Ross | A22B 3/06 |
| | | | 452/58 |
| 7,448,943 B1 * | 11/2008 | Woodford | A22B 3/086 |
| | | | 452/66 |
| 7,662,030 B2 | 2/2010 | Cheek et al. | |
| 8,029,342 B2 * | 10/2011 | Anderson | A61D 7/04 |
| | | | 452/66 |
| 8,113,926 B1 | 2/2012 | Cheek et al. | |
| 8,267,080 B2 | 9/2012 | Sundberg | |
| 2006/0009142 A1 | 1/2006 | Catiaruzzi | |
| 2017/0231237 A1 | 8/2017 | Cheek et al. | |

OTHER PUBLICATIONS

Written Opinion issued Sep. 13, 2019 for PCT/CA2019/051021.
European Search Report for Application No. 19841579.6, dated May 13, 2022.
Restriction Requirement (Mail Date Sep. 28, 2022) for U.S. Appl. No. 17/621,951, filed Jan. 21, 2021.
Notice of Allowance (Mail Date Jun. 7, 2023) for U.S. Appl. No. 17/621,951, filed Jan. 21, 2021.

* cited by examiner

ANIMAL EUTHANASIA METHOD AND APPARATUS

CROSS-REFERENCE TO RELATED APPLICATIONS

This application is a Divisional of U.S. application Ser. No. 17/261,951, having a filing date of Jan. 21, 2021, which claims priority to PCT Application No. PCT/CA2019/051021, having a filling date of Jul. 24, 2019, which is based on U.S. Provisional Application No. 62/702,510, having a filling date of Jul. 24, 2018, the entire contents both of which are incorporated herein by reference.

FIELD OF TECHNOLOGY

The following relates to an apparatus and method for animal euthanasia.

BACKGROUND

In agriculture, it is incumbent upon those involved in the rearing of animals to provide a high level of care and welfare. This includes a stress free environment for growth, and through all stages of the complete life cycle of the animal.

As in nature, the life cycle of animals raised commercially may involve injury, morbidity, and disease. In nature, this often involves suffering and a slow stressful death. In modern agriculture, skilled stockmen and veterinarians are charged with ensuring high levels of animal welfare and, as the need arises, making the decision to quickly and humanely euthanize animals to prevent a protracted stressful death. In larger scale commercial farms, the need to quickly and humanely euthanize animals can be a daily occurrence. In times of large-scale disease outbreaks, such as the 2001 outbreak of Foot and Mouth Disease in the United Kingdom, larger numbers of animals need to be quickly euthanized to prevent the spread of disease.

Many of the front line workers during the 2001 outbreak who had to carry out the euthanasia of these animals have shown symptoms of Post-Traumatic Stress Syndrome. While this example is many magnitudes larger than the day-to-day operations on commercial farms, the same stressors are present. Skilled workers, whose single function is to ensure that animals are raised in a manner that provides the maximum comfort and care to ensure rapid productive growth, are then asked to euthanize those same animals. While they clearly recognize the need for a prompt and humane response, the currently available methods do not provide a solution to reduce the emotional response associated with the necessary act of euthanizing animals. In some situations, animals are not dealt with quickly because no method currently exists to limit the human emotional trauma or stress.

Current methodologies have some disadvantages that prevent optimal euthanasia. Some existing technologies of animal euthanasia rely on anesthetic overdose, using a controlled drug that is administered to the target animal. However, the drug may only be administered by a licensed veterinarian and the process can be costly. Other technologies depend on cranial trauma involving the use of e.g., bullet, or captive bolt, but the process can be traumatic and involves blood and body fluid that may be released in the process. Some methods of animal euthanasia use electrocution, but such a method needs a precise administration of voltage/current to a specific anatomic location to the target animal in order for the method to function as intended. Electric stunning is also currently used prior to slaughter to ensure insensibility prior to exsanguination, although exsanguination is still undesirable due to the associated health and safety implications of releasing large volumes of blood. Rodenticides, such as rodent baits, can be used for rodents but the use of rodenticides is toxic and can result in a prolonged death.

Therefore an opportunity exists to improve both animal and human welfare through advanced euthanasia technology.

SUMMARY

An aspect relates to a euthanasia system and method that can help to improve animal and human welfare. The euthanasia method as described is a single process, which includes simultaneous electric stunning to render the animal instantly insensible, coupled with reduced atmospheric pressure to induce hypoxia. The process provides a humane euthanasia process for both animal and the human operator.

According to an aspect of embodiments of the present invention there is provided an apparatus for euthanasia of at least one animal. The apparatus includes a sealable chamber comprising at least one opening for ingress of the at least one animal into the chamber, at least two electricity conducting elements disposed within the chamber to administer to the at least one animal a flow of current sufficient to stun and render insensibility to the at least one animal; an air evacuation system operably configured to evacuate air from the sealable chamber; and an electrical supply control unit for supplying the electric current to the at least two electricity conducting elements.

In certain embodiments, the electrical supply control unit may also function to operate human safety interlocks, to operate monitoring algorithms, to monitor operating conditions/times to ensure optimal euthanasia conditions are implemented, to monitor ongoing operation of the device, to notify operators of potential maintenance/service requirements, or a combination of these functions.

According to another aspect of embodiments of the present invention there is provided a method of euthanasia of at least one animal within a sealable chamber. The method comprises applying a voltage/current sufficient to stun and render insensibility to the at least one animal, to at least two electricity conducting elements disposed within the sealable chamber; and evacuating air from the sealable chamber.

According to another aspect of embodiments of the present invention there is provided a non-transitory computer readable memory recorded thereon computer executable instructions that when executed by a processor perform the method of euthanasia of at least one animal within a sealable chamber. The method comprises controlling an electrical supply control unit operably connected to the sealable chamber to apply a voltage/current sufficient to stun and render insensibility to the at least one animal, to at least two electricity conducting elements disposed within the sealable chamber; and controlling an air evacuation system operably connected to the sealable chamber to evacuate air from the sealable chamber.

BRIEF DESCRIPTION

Some of the embodiments will be described in detail, with references to the following Figures, wherein like designations denote like members, wherein.

DETAILED DESCRIPTION

Described herein is an apparatus and method for animal euthanasia that involves a process to euthanize animals.

According to various embodiments of the disclosure, the animal euthanasia process includes simultaneously:

a. electric stunning in a euthanasia chamber to render to the animal(s) instant insensibility; and b. reduction of atmospheric pressure in the euthanasia chamber to induce animal hypoxia, which leads to death while the animal(s) are rendered insensible.

Embodiments of the invention serveto isolate the human operator from the actual euthanasia event. The euthanasia is performed by the machine in a sealed box and humans do not touch the animal or see the euthanasia event happening. This distance from the process leads to less human distress and trauma around euthanasia.

Figure 1:
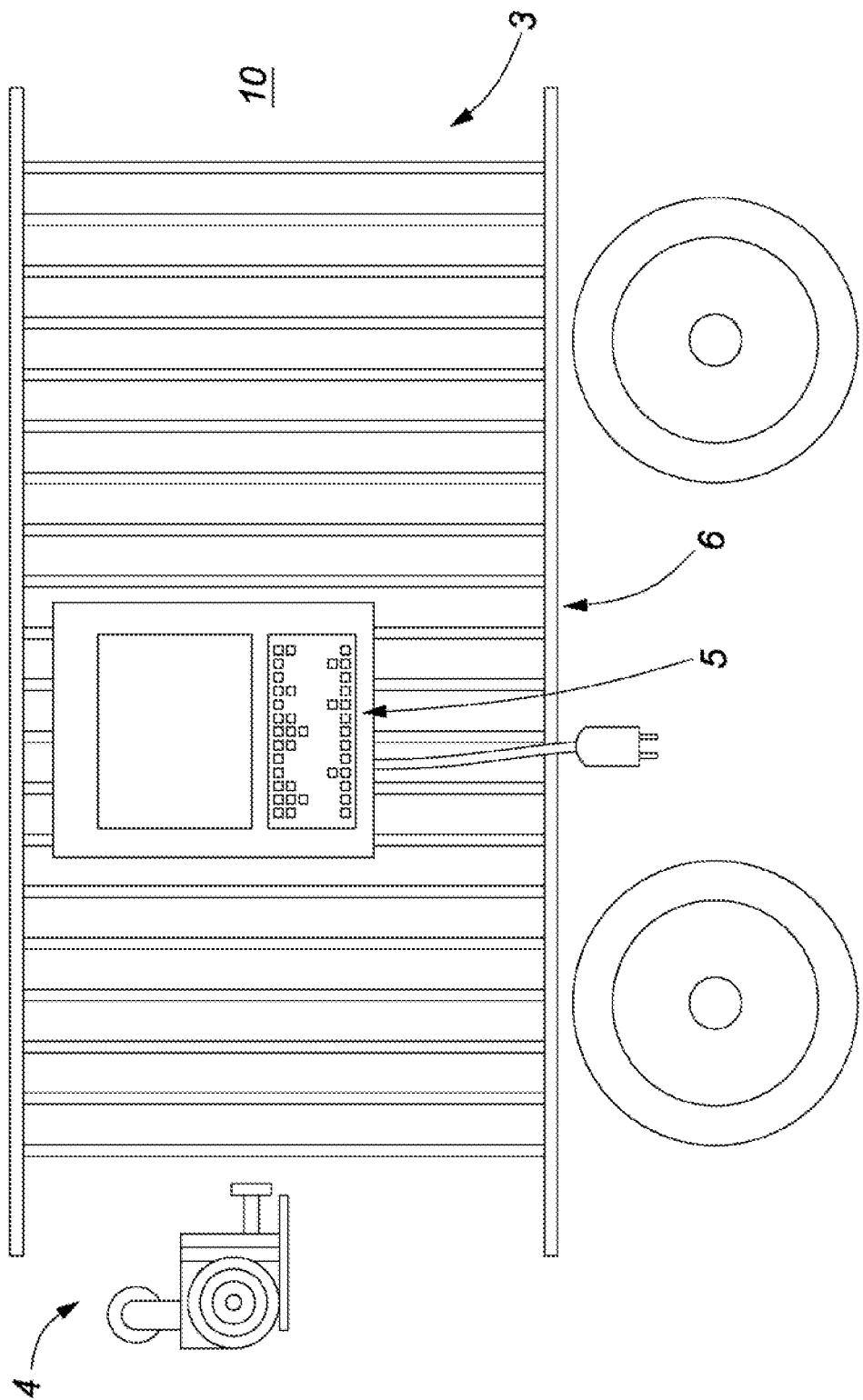
FIG. 1 shows an inside view of an apparatus for animal euthanasia, in accordance with an embodiment of the present invention.
Figure 2:
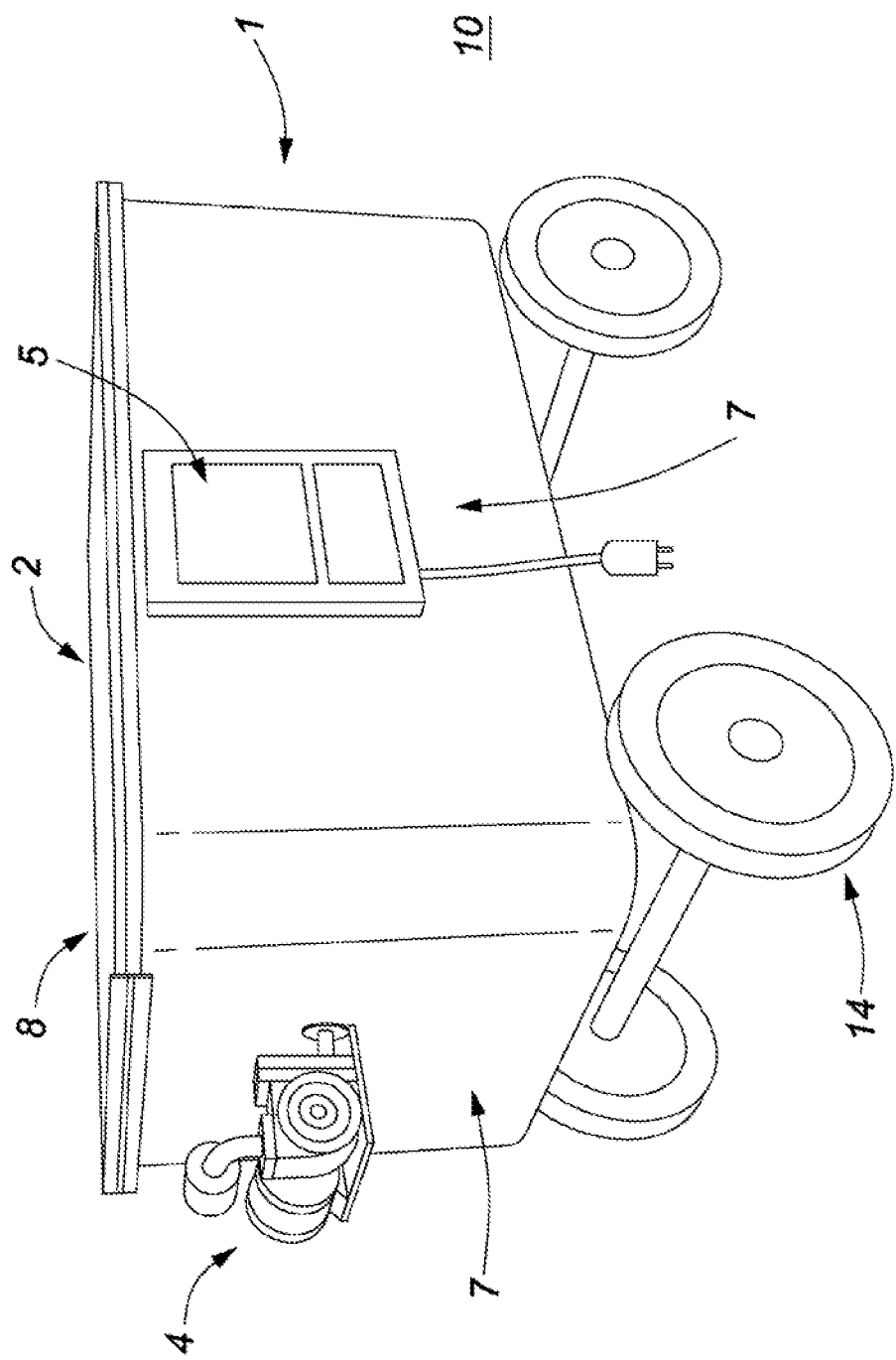
FIG. 2 shows an outside view of the apparatus as shown in FIG. 1.

FIG. 1 shows an inside view of an apparatus (10) for animal euthanasia, according to an embodiment of the disclosure. FIG. 2 shows an outside view of the apparatus (10), as shown in FIG. 1.

As illustrated in FIGS. 1 and 2, the apparatus (10) includes a sealable chamber (1) into which one or more animals can be loaded. The sealable chamber (1) includes at least one opening (2) for ingress of the one or more animals into the chamber (1) and the chamber (1) can be sealed by closing the opening (2).

In this embodiment, the chamber (1) includes a base (6) and sidewalls (7), and the at least one opening (2) includes a sealable hinged door (8) at the top of the chamber (1) adapted for loading and unloading the animals through the opening (2). In other words, the apparatus (2) as shown in FIGS. 1 and 2 includes a top loading feature. While this configuration can be beneficial for euthanizing small animals, such as rodents, rabbits, poultry, piglets or other small farm animals that can be picked up and placed into the device, other structures can be envisioned, as will be shown, particularly in the event where the apparatus is modified for large animal applications.

It is envisioned that the sealable chamber may be "sealable" to different degrees, depending upon the overall configuration and size of the apparatus. For example, in some embodiments the sealable chamber (1) may not require a perfect seal, but should be tightly closed to sufficient degree as to allow the atmospheric pressure to be reduced to a point of inducing fatal animal hypoxia.

The apparatus (10) is further equipped with at least two, and in the illustrated embodiment, a plurality of electricity conducting elements (3) disposed throughout the chamber (1). The electricity conducting element(s) (3) act to administer to the animals a voltage/current sufficient to render insensibility to the animals.

As illustrated in FIG. 1, the electricity conducting elements (3) are a series of vertical chains disposed throughout the chamber (1) in an array. The electricity conducting elements (3) are configured be electrified, for use in the electric stunning process.

In other embodiments, there may be no physical contact between the animal and the electricity conducting elements (3), e.g. electrode. The ordinary skilled person will appreciate that an electrode can be anything that provides a path for the electricity to follow, and this can be air if the voltage is sufficient to jump the gap. In further embodiments, the electrode can include a liquid in the bottom of the enclosure, it can be a chain or plurality of chains as illustrated in FIG. 1, or else it can be configured into the floor or sidewall of the chamber (1).

To conduct electricity, the skilled person will appreciate that two points of differing voltages will be required. Typically, there will be a point of contact that is considered positive and one that is considered negative, although it is also possible that one point of contact can be more positive than the other, causing the voltage differentiation to cause a current to flow.

An electrical supply control unit (5) is mounted on the apparatus (2) for supplying of the electric current to the electricity conducting elements (3). The electrical supply control unit (5) can comprise a power supply, including for example, a generator, solar cell, and/or battery, and/or a power cord for connecting to an external power source. In one embodiment of the disclosure, the voltage/current applied to the electricity conducting elements (3) is AC of at least 110V. In other embodiments the voltage/current applied to the electricity conducting may be AC of 220V. In further embodiments the voltage/current applied to the electrodes or the control unit or operating controls may be DC of sufficient parameters as will be apparent too those skilled in the art. Different embodiments may involve selecting other voltage/current parameters as will be apparent to those skilled in the art.

The apparatus (2) also includes an air evacuation system (4) operably configured to evacuate air from the sealable chamber (1). The air evacuation system (4) can be a vacuum pump configured to extract air from the chamber (1) for inducing hypoxia.

It will be appreciated that the air evacuation system (4) may be configured to "evacuate" air to different degrees, depending upon the overall configuration and size of the apparatus. For example, in most embodiments the air evacuation system (4) will only need to be configured to lower atmospheric pressure in the chamber (1) to the point of inducing fatal animal hypoxia.

All of the electrical components can be controlled by a control unit (11) (see FIG. 6) that is configured to communicate with the electrical supply control unit (5) and the air evacuation system (4). The control unit (11) includes a processor or microprocessor configured to execute software for controlling the operation of the air evacuation system (4) and electrical supply control unit (5). The software controls various parameters needed to ensure consistent and safe usability. The control unit (11) can also include a user interface provided to enable user operation and/or control from outside of the apparatus (10). The control unit (11) may comprise network connectivity, for example, Wi-Fi and/or Bluetooth connectivity, for communication with one or more additional devices in or outside of the apparatus.

Of the parameters controlled, it should be understood that for different species of animals the system may determine the correct type and amount of voltage/current and cycle times to render the animal insensible. In certain embodiments, this may be repeated on a regular cycle to ensure continued insensibility.

The apparatus can be mounted as a transportable cart comprising a set of wheels (14) for facilitating transport of the apparatus (10).

Figure 3:
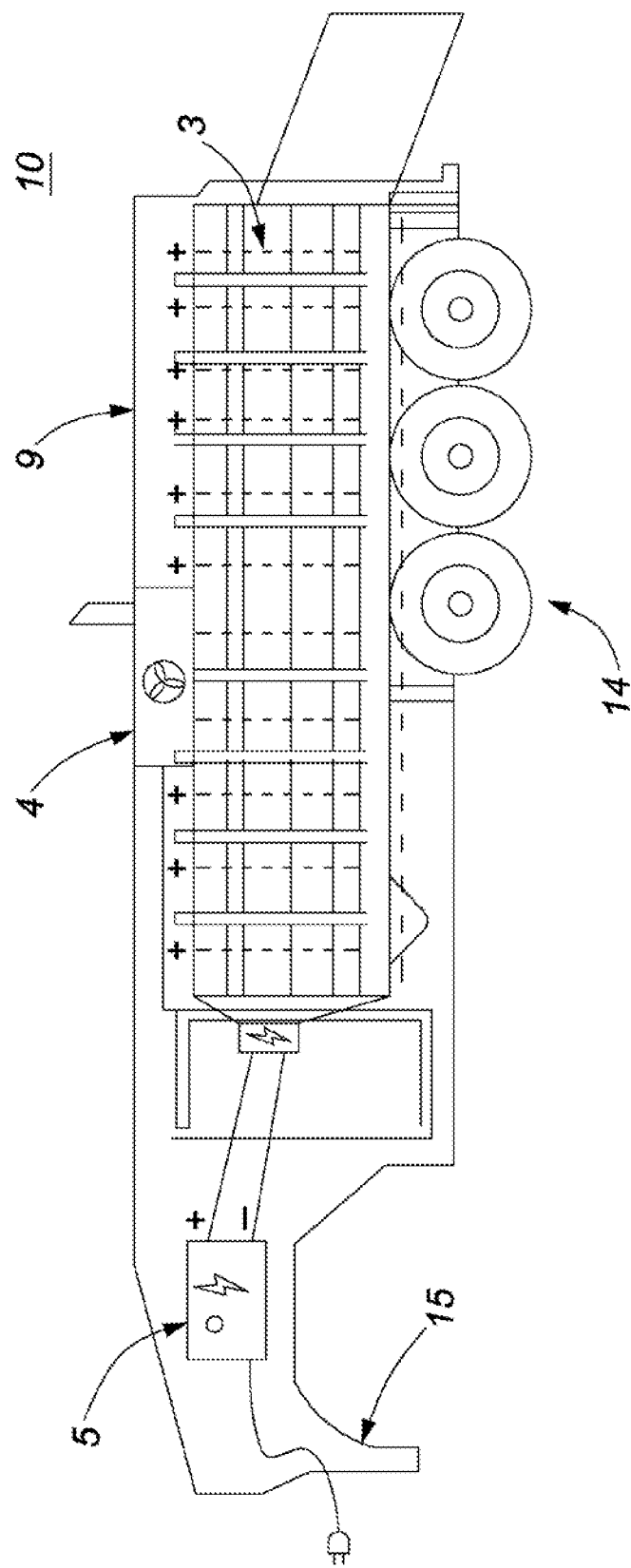
FIG. 3 shows a cross-sectional view of an apparatus for animal euthanasia, in accordance with another embodiment of the present invention.
Figure 4:
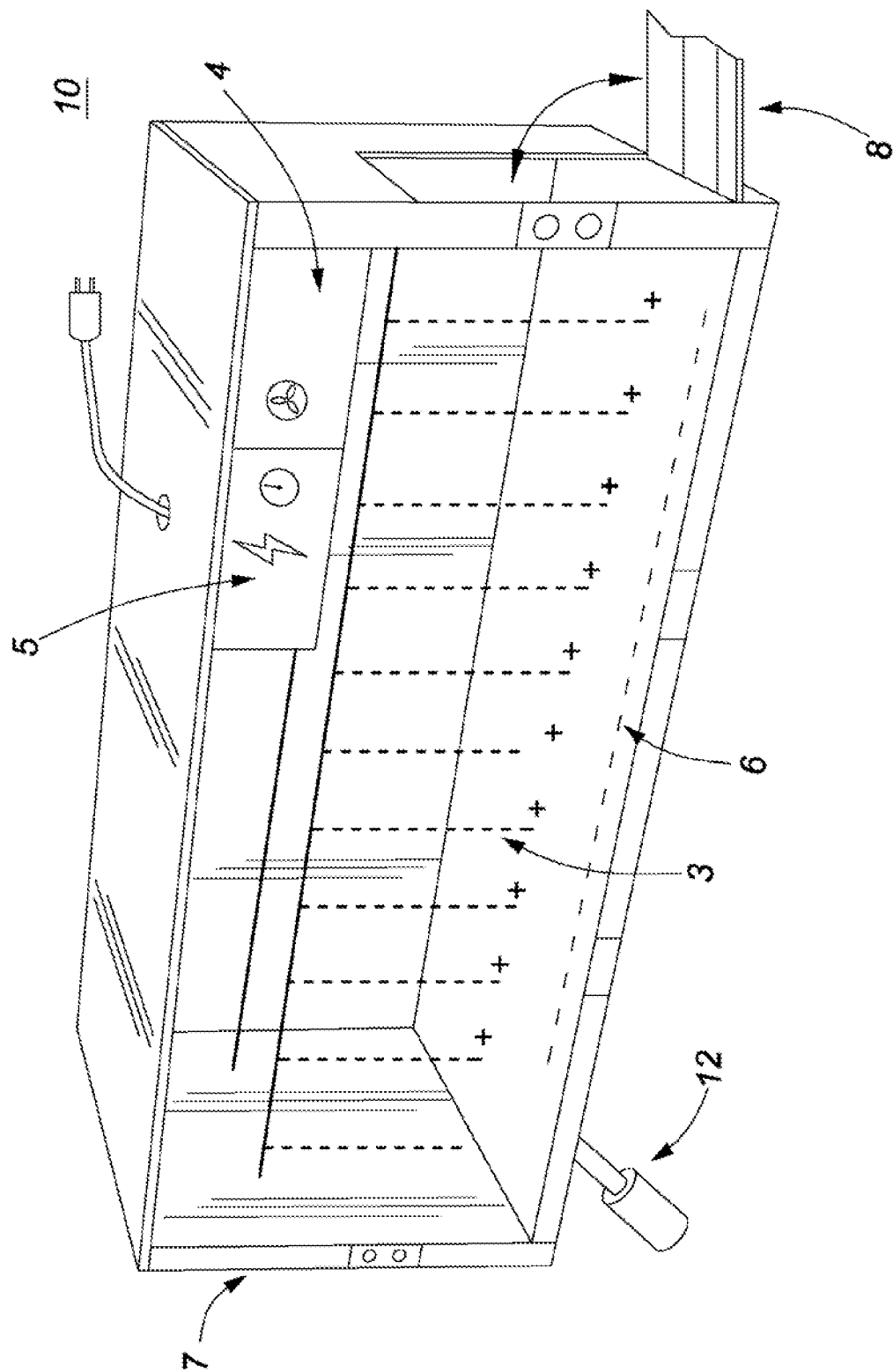
FIG. 4 shows a perspective view of the apparatus as shown in FIG. 3.

FIG. 3 is a cross-sectional view of an animal euthanasia apparatus (10), according to another embodiment of the disclosure. FIG. 4 is a perspective view of the apparatus (10) as shown in FIG. 3.

As illustrated in FIGS. 3 and 4, the chamber (1) comprises a base (6), a top (9), and sidewalls (7). In this embodiment, the at least one opening (2) includes a sealable hinged door (8) at one end of the chamber (1) adapted for loading and unloading the animals through the opening (2). The chamber (1) is shaped and dimensioned as a shipping container wherein the sealable hinged door (8) is adapted to function as a loading ramp and gate.

The base (6) can further include a lift (12) for emptying contents of the apparatus (10) and/or a sealable door in the floor of the base (not shown) for emptying contents of the apparatus. It would be apparent to those skilled in the art that the lifting mechanisms may be of varying types as require/dictated by the size and quantity of the animals being placed or moving into the apparatus. These types may include but are not limited to: application of human force, mechanical means or mechanical device such as a winch or lever, hydraulics including cylinders, motors or levers, and electrical mechanisms including actuators, motors, coils or levers.

As shown in FIG. 3, the apparatus can include at least one pulling or towing element (15) adapted to allow a user to pull or tow the apparatus (10).

Figure 5:
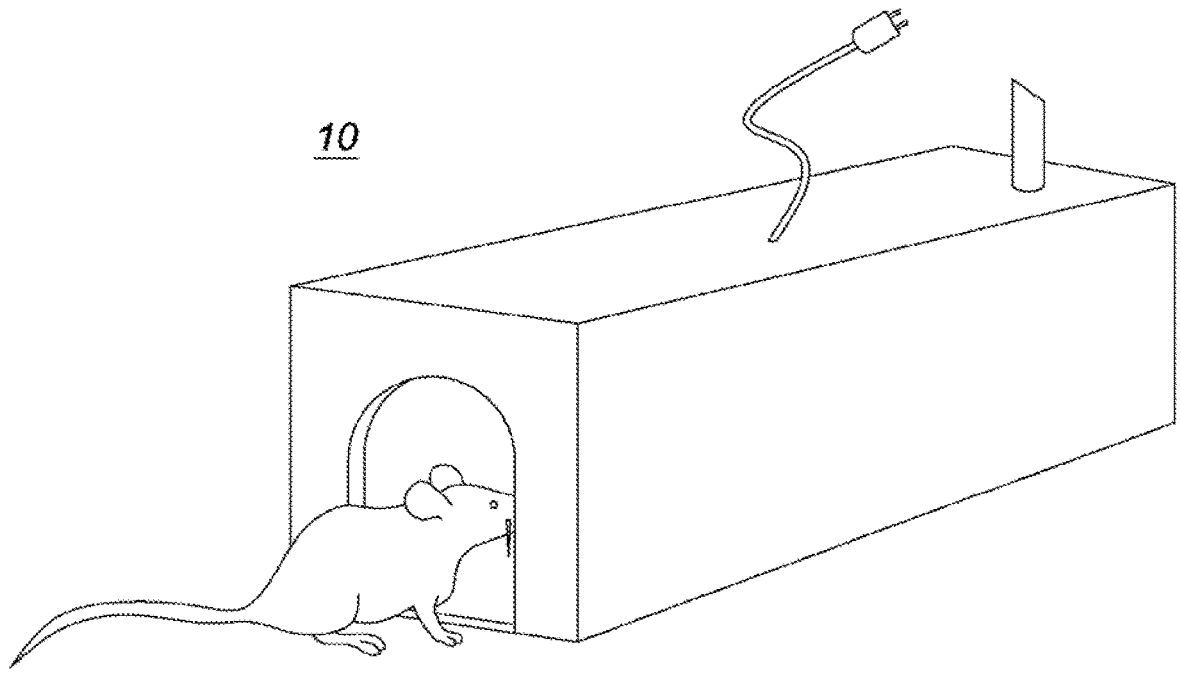
FIG. 5 shows the apparatus of animal euthanasia for use in rodent control, in accordance with an embodiment of the present invention.
Figure 6:
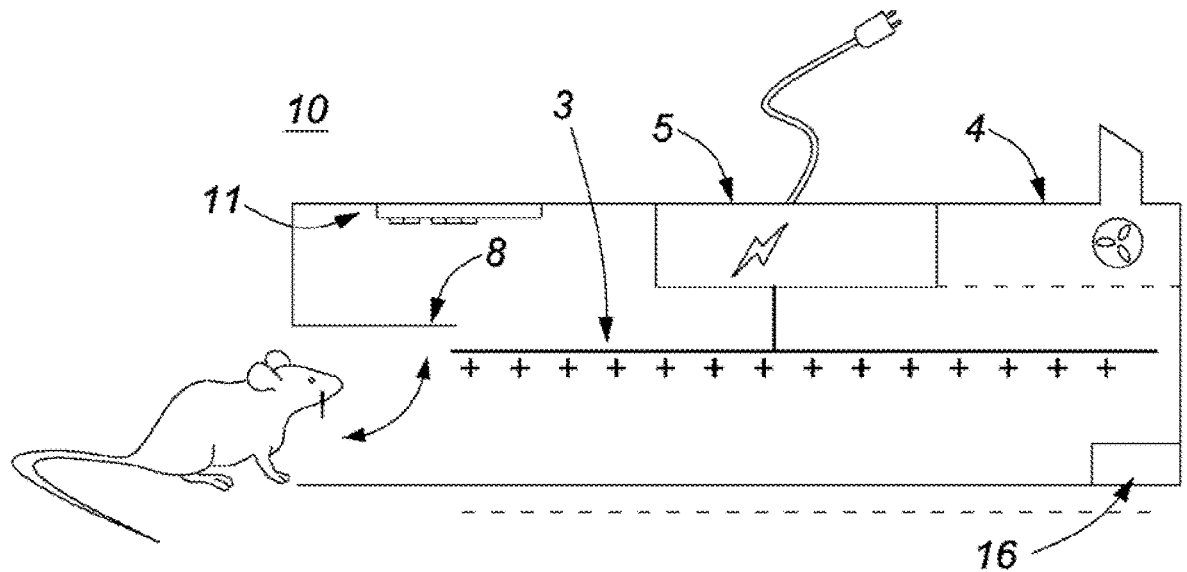
FIG. 6 shows a cross-sectional view of the rodent entering the apparatus of animal euthanasia through the sealable hinged door, in accordance with an embodiment of the present invention.
Figure 7:
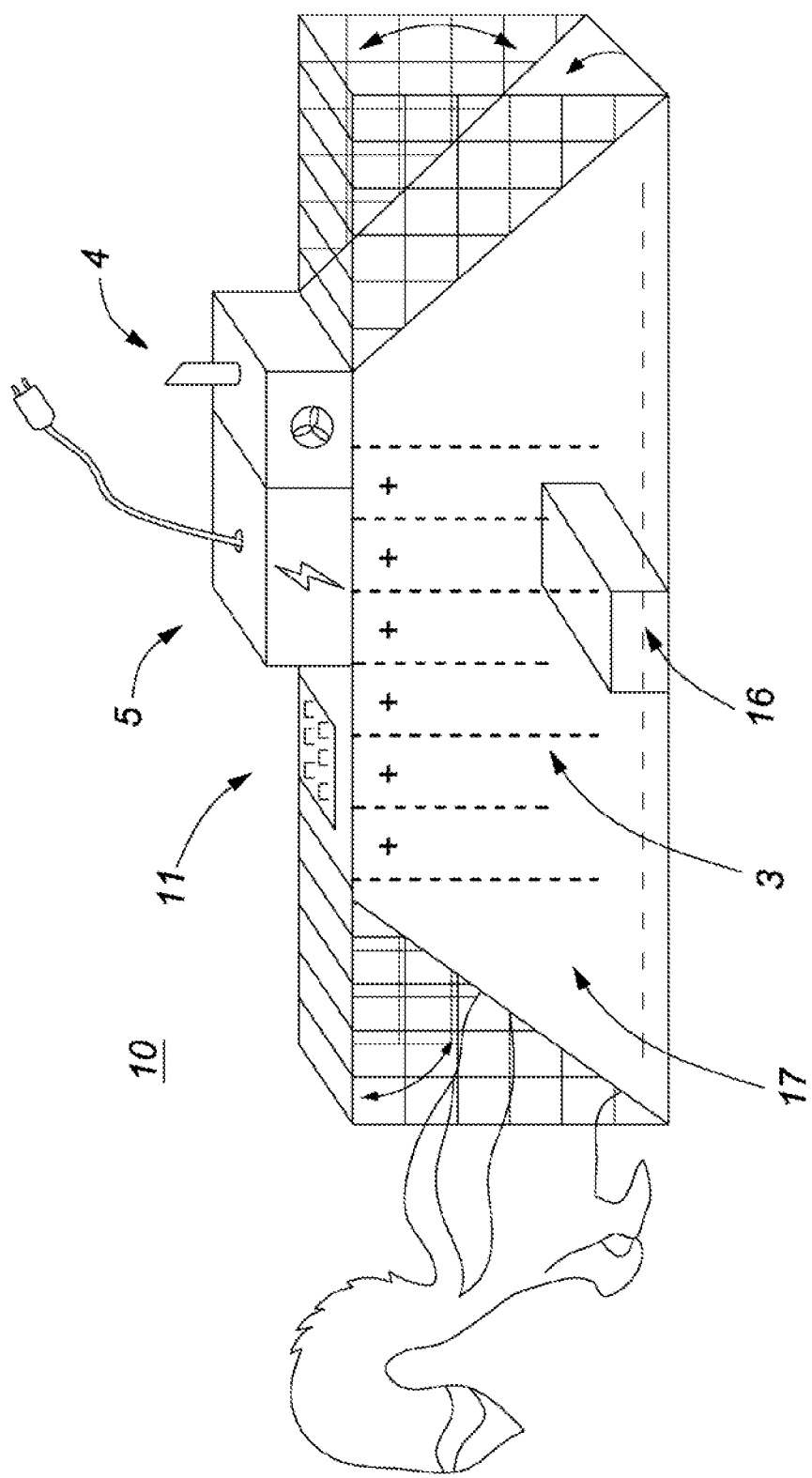
FIG. 7 shows a perspective view of a large animal entering the apparatus of animal euthanasia through the sealable hinged door, in accordance with another embodiment of the present invention.

FIG. 5 shows the animal euthanasia apparatus (1) for use of a rodent. FIG. 6 is a cross-sectional view of the rodent entering the apparatus (10) through the sealable hinged door (8). FIG. 7 is a perspective view of a larger animal entering the apparatus (10) through the sealable hinged door (8).

In the embodiment as shown in FIGS. 6 and 7, the apparatus (10) can be shaped and dimensioned as an animal trap, and further includes a bait station (16). In some embodiments, the apparatus may include a sensor which is configured to communicate with the control unit (11). The sensor can be coupled to the bait station (16) in the sealable chamber (1) and configured to detect a presence of at least one animal. When an animal is detected at the bait station (16), the control unit (11) will control the sealable hinged door (8) at the one end of the chamber (1) to close. In one non-limiting embodiment, the sensor may be an infrared sensor to detect the presence of the animal, or alternatively, it may comprise a scale to detect the weight of the animal or a camera to estimate the overall size of the animal. Other sensor options are envisioned as well, and will be apparent to the skilled person based on the intended application of the apparatus.

In some embodiments, the apparatus may also include a camera (17) or an image capturing unit mounted in the sealable chamber (1) configured to communicate with the control unit (11). The camera (17) can capture one or more images of the animal and send the images to the control unit (11) for image recognition. The control unit (11) is configured to run image recognition software to determine the species of the animal. If the species of the animal matches a predetermined species, such as a rodent, the control unit (11) can automatically control the process described above to start.

This way, the method can operate independently from a human operator in the case of certain species, such as rodents, where the rodents could be enticed to enter a trap and the described process would euthanize the rodents humanely rather than through use of toxins, trauma and/or entrapment.

Figure 8:
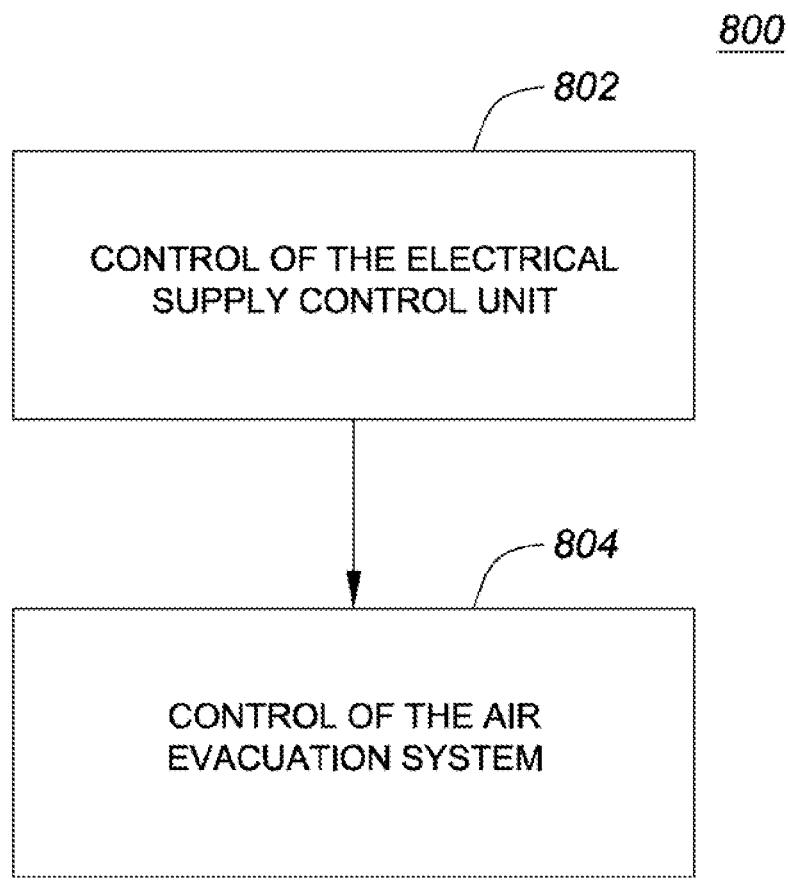
FIG. 8 shows a flowchart of a method of animal euthanasia, in accordance with an embodiment of the present invention.

FIG. 8 is a computer-implemented method (800) of animal euthanasia, according to one embodiment of the disclosure. The method includes the control unit (11) comprising the processor executing instructions for controlling (802) the electrical supply control unit (5) to apply a voltage/current sufficient to stun and render insensibility to one or more animal(s), the voltage/current being applied to the at least two electricity conducting elements (3) disposed within the sealable chamber (1). The air evacuation system (4) is controlled (804) to evacuate air from the sealable chamber (1).

According to various embodiments of the disclosure, animal(s) can be placed in the sealable chamber (1) so that the system can provide the euthanasia without any human operator directly delivering the trauma or drugs. This indirect method removes the human discomfort and stress associated with euthanasia and would increase the willingness of people to provide euthanasia promptly when needed and appropriate. There is a natural human aversion to euthanasia, particularly if traumatic, and the described method would eliminate such aversion, improving human wellbeing.

When using the apparatus or method as described in various embodiments of the disclosure, no drugs or gasses would be required. The sealable chamber (1) can be designed to be safe and pose no risk to human health.

The apparatus (10) is a robust and simple design, enabling a reasonably priced unit and the cost would not be a barrier to appropriate euthanasia.

Software can control effectiveness of the process and ensure optimal outcome to both the animal and operator. Safeguards would be built in to prevent human hazards and ensure proper loading and operation. In certain embodiments, the software program will be designed to apply the voltage/current proportional to the size and type of animal to ensure sensibility is attained, and for a duration timed to ensure insensibility continues until air is evacuated. In further embodiments, the software program will test the seal of the chamber to make sure air is effectively evacuated. In this embodiment, if there is a problem with the seal or electrical supply a notification is then sent to the user that the euthanasia sequence will not be initiated. This ensures that animals will not be injured if there is a problem with equipment. In yet further embodiments, sensors will be included in the system that detect the need for maintenance work, and operate with the software program to ensure continual effective performance. The software may also operate in connection with sensors built into the opening, or lid of the sealable chamber to ensure that voltage/current is not applied while the chamber is open, or during any maintenance to ensure that the operator or bystanders are not inadvertently injured.

Figure 9:
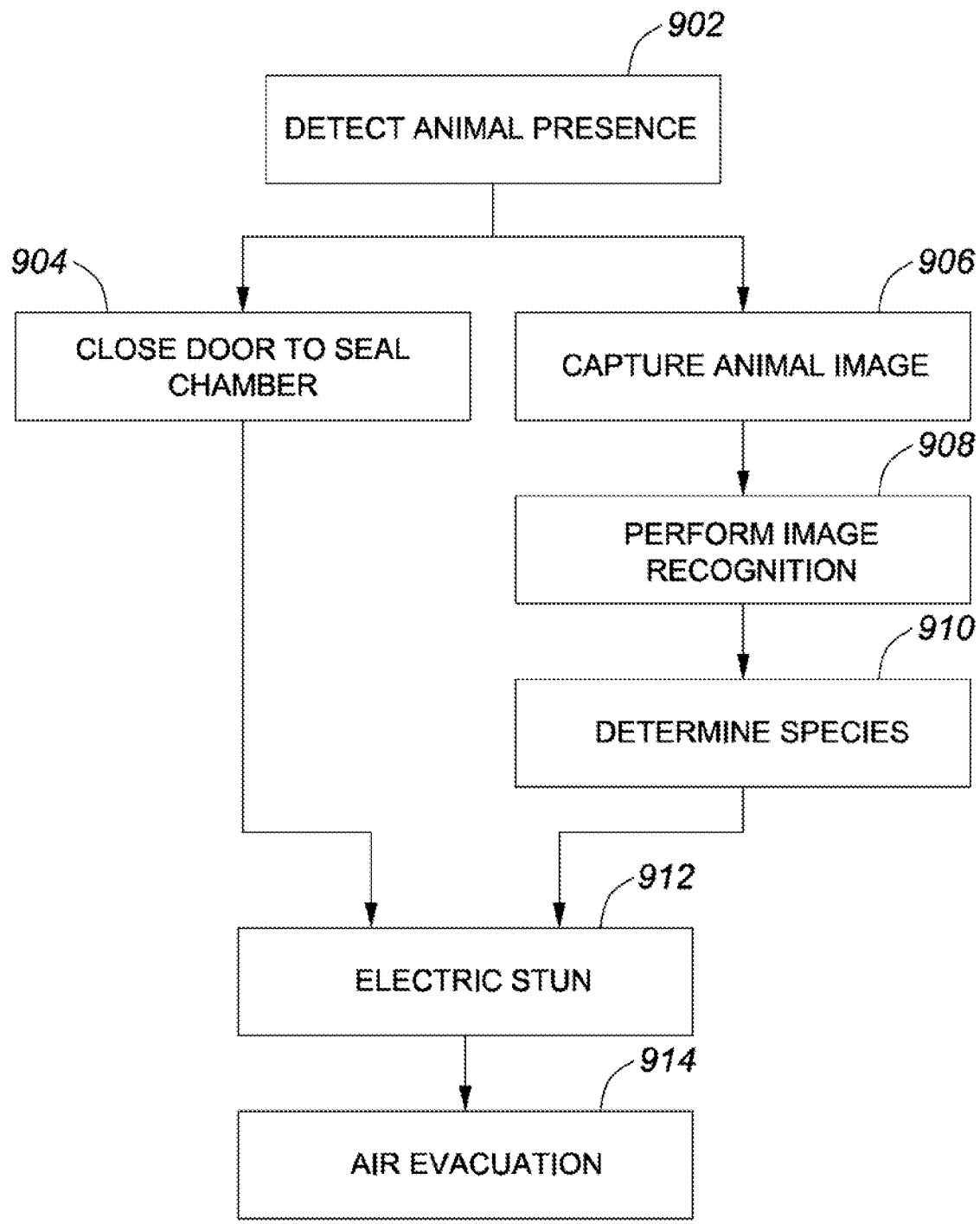
FIG. 9 shows a flowchart of a method of animal euthanasia, in accordance with another embodiment of the present invention.

FIG. 9 is computer-implemented method (900) of animal euthanasia, according to another embodiment of the disclosure. The method starts when at least one animal is detected (902) in the sealable chamber (1). This can include the control unit (11) receiving a detection signal of a presence of the at least one animal, from the sensor coupled to the bait station (16) in the sealable chamber. When the detection signal is received, the processor controls the sealable hinged door (8) at one end of the sealable chamber to close (904). Subsequently or simultaneously, the processor can instruct the camera (17) mounted in the sealable chamber (1) to capture (906) an image of the at least one animal. When the image of the at least one animal is received, the processor performs (908) an image recognition software to determine the species of the at least one animal. The processor then determines (910) whether the species of the at least one animal matches a predetermined species, and can instruct the steps of electric stun (912) and air evacuation (914) to start, when it is determined that the species of the at least one animal matches the predetermined species.

Any of the methods disclosed herein may be implemented in hardware, software, firmware or any combination thereof. Where implemented as software, the method, acts or operations may be programmed or coded as computer-readable instructions and recorded electronically, magnetically or optically on a fixed or non-transitory computer-readable medium, computer-readable memory, machine-readable memory or a computer program product (non-transitory computer readable storage medium having instructions, which when executed by a processor, perform actions). In other words, the computer-readable memory or computer-readable medium comprises instructions in code, which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a CD-ROM, a DVD, RAM, ROM, EPROM, Flash Memory or any suitable memory card, etc. The method may also be implemented in hardware.

EXAMPLE

Veterinary Case Report

Background: Current methodologies to euthanize pigs on farms have some disadvantages. Animals can be euthanized by anesthetic overdose, but this process is costly and is not applicable to farm situations. Other more common technologies depend on cranial trauma involving the use of bullets, or captive bolt equipment, but the process can be traumatic and involves a release blood and body fluids. Some methods of animal euthanasia can use electrocution, but such a method needs a precise administration of voltage/current to a specific anatomic location to the target animal in order for the method to function as intended. Carbon dioxide as a means of euthanasia is available, but the animals may struggle for air before death occurs. The trauma involved in euthanasia can have an emotional response in people which may preclude optimal application and have a negative impact on human health.

Electric stunning is currently used at slaughter to ensure insensibility prior to exsanguination. This process is not practical on a farm as exsanguination is still undesirable due to the associated health and safety implications of releasing large volumes of blood. An opportunity exists to improve both animal and human welfare through improved euthanasia technology that involves stunning an animal to ensure instant loss of consciousness coupled by a method to ensure death before the animal regains sensibility. This case report describes a process that could be developed to be a practical method for humane euthanasia of animals.

Technique: The concept of utilizing existing stunning technology along with air evacuation creating a hypobaric chamber was chosen to be tested under veterinary oversight. Two neonatal runt piglets from a commercial farm that were scheduled to be humanely culled because of a poor prognosis were presented for euthanasia. They weighed approximately 1.5 kg and were euthanized in the following manner:

1) Piglets were given an injection of Azaperone (Stresnil) DIN 00755710 at 2.2 mg/kg to sedate and tranquilize the pigs 20 minutes ahead of the procedure.

2) A commercial stunner, Hog stunner—Best and Donovan, Cincinnati OH, USA, was used to stun the piglets. Piglet 1 received 280 volts for 1 second. Piglet 2 received 280 volts for 2 seconds.

3) A commercial vacuum packer Gastrovac Pro, Henkovac Vacuum systems, Hertogenbosch, Nederland, was used to evacuate the air from around the pigs and create a lasting negative air pressure environment that the piglets were placed in.

Observations: The stunner rendered both piglets instantly unconscious based on the absence of palpebral/corneal reflex or awareness of surroundings. The piglets did not regain consciousness, there were no signs of awareness, no palpebral, gag, or corneal reflex. A gasping reflex was noted, which was an expected terminal event. Piglets were monitored continuously for 30 mins and declared dead after 3 mins when no signs of life were detected.

Conclusion: The combination of stunning pigs to remove consciousness followed by immediate air evacuation, successfully and humanely euthanized these two piglets. It reflects proof of the concept that animals can be euthanized using the technique outlined above. Refinements are needed for commercial application, but the technique offers notable advantages to current technology and development should be investigated further.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of euthanasia of at least one animal within a sealable chamber, comprising:
   applying a voltage/current sufficient to stun and render insensibility to the at least one animal, to at least two electricity conducting elements disposed within the sealable chamber; and
   evacuating air from the sealable chamber to create a reduced atmospheric pressure suitable to induce hypoxia.

2. The method according to claim 1, wherein the voltage/current applied to the at least two electricity conducting elements is AC or DC of at least 110V or at least 220V, or a voltage/current sufficient to stun and render insensibility.

3. The method according to claim 1, further comprising:
   detecting, by a sensor coupled to a bait station in the sealable chamber, a presence of the at least one animal; and
   closing a sealable hinged door at one end of the sealable chamber when the presence of the at least one animal is detected.

4. The method according to claim 3, further comprising:
   capturing, by an image capturing unit mounted in the sealable chamber, an image of the at least one animal; and
   performing image recognition of the image of the at least one animal to determine a species of the at least one animal.

5. The method according to claim 4, further comprising:
   determining whether the species of the at least one animal matches a predetermined species; and
   automatically performing the steps of applying and evacuating, when it is determined that the species of the at least one animal is the predetermined species.

6. The method according to claim 1, wherein the sealable chamber comprises a collapsible material that collapses around the animal when air is evacuated.

7. The method according to claim 6, wherein the collapsible material is a plastic bag, pouch, or bladder.

8. The method according to claim 7, wherein the sealable chamber is a vacuum packer.

* * * * *